United States Patent
Lin

(10) Patent No.: US 6,175,674 B1
(45) Date of Patent: Jan. 16, 2001

(54) ADJUSTABLE COMPENSATION DEVICE FOR FIBER BRAGG GRATINGS

(75) Inventor: Samuel I-En Lin, Chu-Nan (TW)

(73) Assignee: UCONN Technology Inc. (TW)

( * ) Notice: Under 35 U.S.C. 154(b), the term of this patent shall be extended for 0 days.

(21) Appl. No.: 09/264,644

(22) Filed: Mar. 8, 1999

(51) Int. Cl.[7] .................................................. G02B 6/34
(52) U.S. Cl. ................................. 385/37; 385/13; 385/147
(58) Field of Search ...................................... 385/37, 12, 6, 385/13, 27, 28, 147; 250/227.17; 356/345; 372/6, 32

(56) References Cited

U.S. PATENT DOCUMENTS 5,841,920 * 11/1998 Lemaire et al. ....................... 385/37
6,044,189 * 3/2000 Miller ..................................... 385/37

* cited by examiner

Primary Examiner—Phan T. H. Palmer
(74) Attorney, Agent, or Firm—Michael D. Bednarek; Shaw Pittman

(57) ABSTRACT

An adjustable compensation device for fiber Bragg gratings. The device includes a bimetal structure and a fixture. An optical fiber provided with fiber Bragg gratings is connected to the bimetal structure. The fixture firmly holds the bimetal structure so that the bimetal structure behaves like cantilever beams to compensate pitches of the fiber Bragg gratings. Furthermore, a shim can be inserted between the bimetal structure and the fixture so as to incline the bimetal structure. The compensation for the change of the length of the optical fiber can be adjusted by changing the fixture and/or shim.

4 Claims, 11 Drawing Sheets

ADJUSTABLE COMPENSATION DEVICE FOR FIBER BRAGG GRATINGS

BACKGROUND OF THE INVENTION

1. Field of the Invention

The present invention relates in general to an adjus compensation device for fiber Bragg gratings.

2. Description of the Related Art

Fiber Bragg gratings (FBGs) are very important elements widely used in the fabrication of various functional devices for dense WDM networks, for example FBG stabilized laser sources and various FBG-based WDM devices for multiplexers, demultiplexers and add/drop filters. In the practical application of FBGs, however, a problem arising from changes in the surrounding temperature has been noticed. Because the pitch of the FBGs determines the central frequency of the reflected optical signal transmitted in an optical fiber, the FBGs are carefully designed and accurately manufactured. The problem is that the optical fibers elongate in a raised surrounding temperature so that the pitches of the FBGs deviate from the design value. Such a situation is not desirable.

FIG. 1A shows a temperature compensation device for fiber Bragg gratings using a bi-metal structure which includes two arms 13, 13' and two metal plates 14, 15. The two metal plates 14, 15 are welded together while the two arms 13, 13' are welded at the sides of the metal plates 14, 15. The thermal expansion coefficient of the metal plate 14 is smaller than that of the metal plate 15.

In operation, an optical fiber 11 provided with FBGs 12 are glued onto the arms 13, 13'. The optical fiber 11 tends to elongate in a raised surrounding temperature. However, the temperature compensation device bends, as shown in FIG. 1B, due to different thermal expansion coefficients between the two metal plates 14, 15, so as to prevent the optical fiber 11 from elongating. By this arrangement, the change in the pitches of the FBGs 12 arising from the raised temperature can be greatly reduced.

The above-mentioned temperature compensation device for fiber Bragg gratings does lessen the influence of temperature change on the FBGs. However, the compensation in such a way is not very accurate because of the tolerances arising from manufacturing and packaging (In operations, the temperature compensation device is packaged by a box with the ends of the optical fiber fixed to the box. This can prevent an external force, such as a careless pull at the optical fiber, from destroying the temperature compensation device). For example, the tolerances may arise from overstretching the optical fiber when: (1) gluing the optical fiber onto the bi-metal structure; (2) attaching the ends of the optical fiber to the box for packaging. It is understood that tolerances are not considered in design. However, tolerances do influence the control over the changes of the length of the optical fiber so that the compensation of the change of pitches of the FBGs is not accurate.

SUMMARY OF THE INVENTION

An object of the present invention is to provide an adjustable compensation device for fiber Bragg gratings that solves the above-mentioned problem.

In accordance with the object of the present invention, an adjustable compensation device for fiber Bragg gratings is provided. The device includes a bimetal structure and a fixture. An optical fiber provided with fiber Bragg gratings is connected to the bimetal structure. The fixture firmly holds the bimetal structure so that the bimetal structure behaves like cantilever beams to compensate pitches of the fiber Bragg gratings. Furthermore, a shim can be inserted between the bimetal structure and the fixture so as to incline the bimetal structure. The compensation for the change of the length of the optical fiber can be adjusted by changing the fixture and/or shim.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1A:
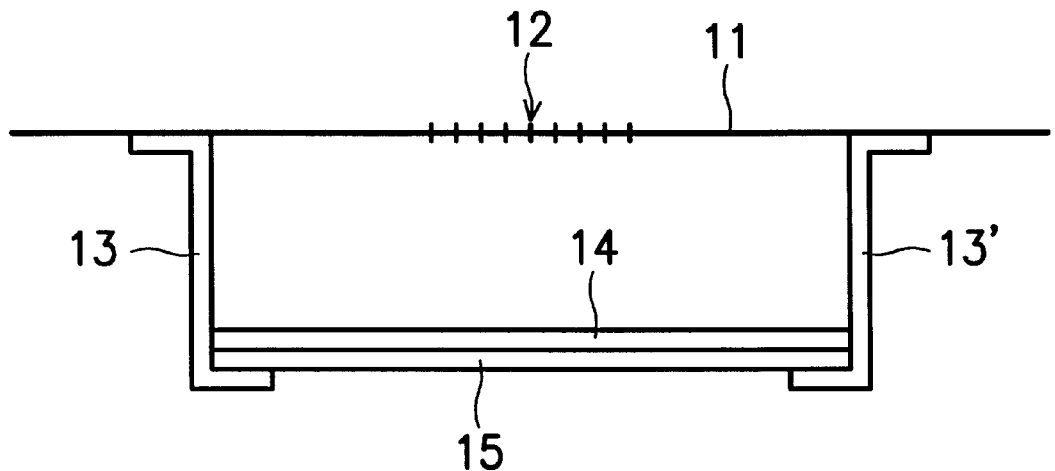
FIG. 1A shows a conventional temperature compensation device for fiber Bragg gratings using bimetal structure.
Figure 1B:
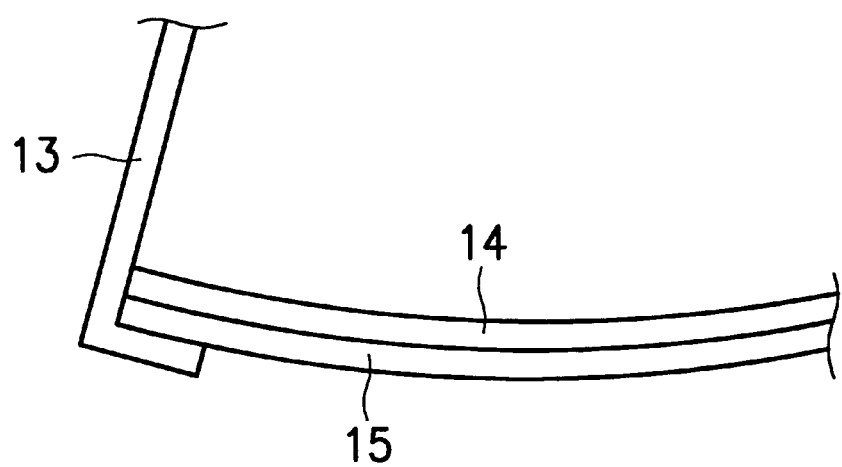
FIG. 1B shows the temperature compensation device of FIG. 1A bent in a raised temperature.
Figure 2A:
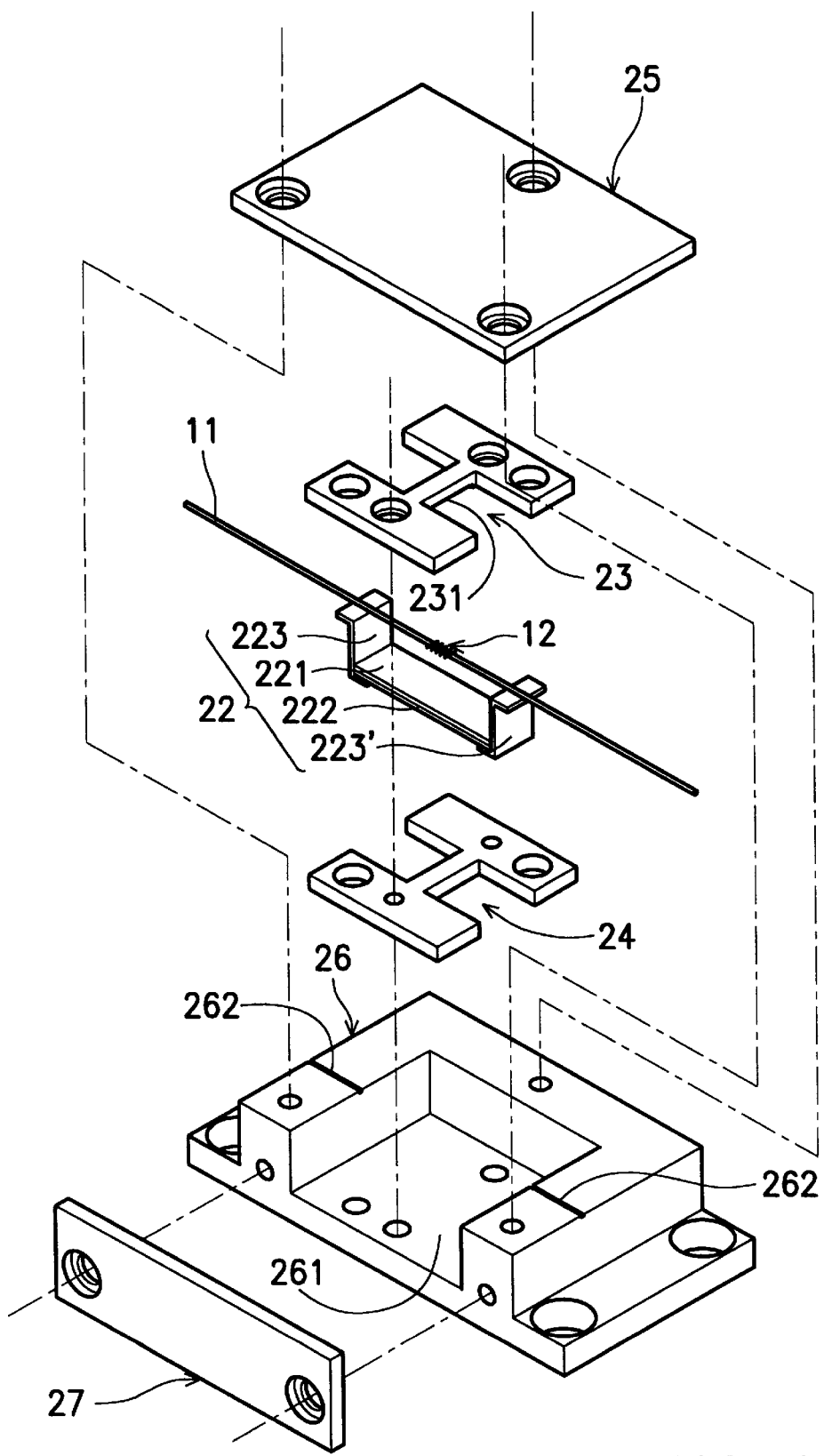
FIG. 2A is an exploded perspective diagram of an adjustable compensation device for fiber Bragg gratings in accordance with an example of the present invention.

Referring to FIG. 2A, an adjustable compensation device for fiber Bragg gratings in accordance with the present invention including a bimetal structure 22, a top fixing member 23 and a bottom fixing member 24.

The bimetal structure 22 includes two arms 223, 223' and two metal plates 221, 222, wherein the thermal expansion coefficient of the metal plate 221 is smaller than that of the metal plate 222. The two metal plates 221, 222 are welded together while the two arms 223, 223' are welded at the sides of the metal plates 221, 222. An optical fiber 11 provided with FBGs 12 is glued onto the arms 223, 223'.

Figure 2B:
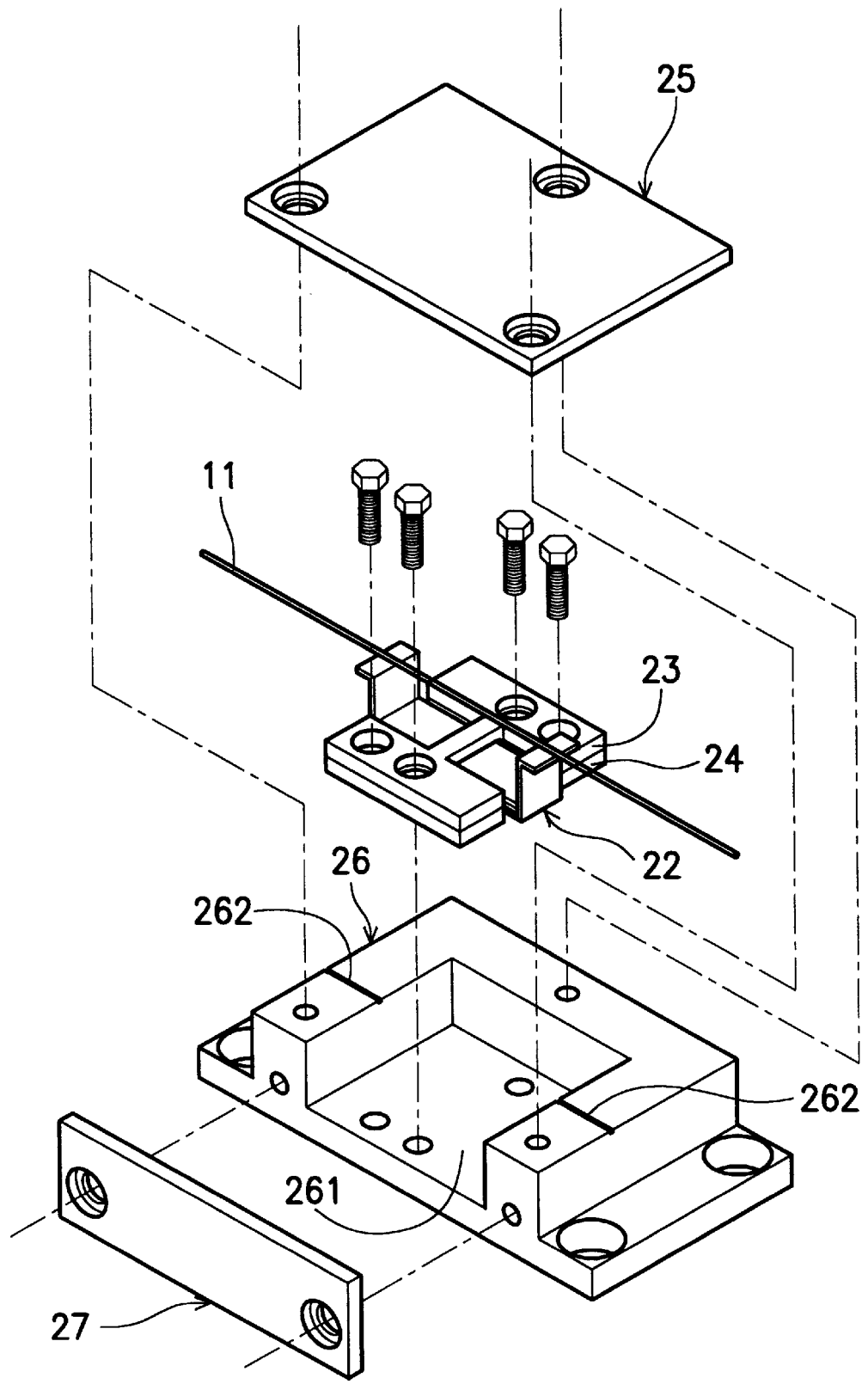
FIGS. 2B–2D show the steps of assembling the adjustable compensation device for fiber Bragg gratings in FIG. 2A.

The two fixing members 23, 24 are I-shaped and used for clamping the bimetal structure 22. On the bottom of the top fixing member 23 is formed a recess 231 for receiving the metal plates 221, 222 while clamping, as shown in FIG. 2B. Then, the two fixing members 23, 24 are firmly screwed together.

Figure 2C:
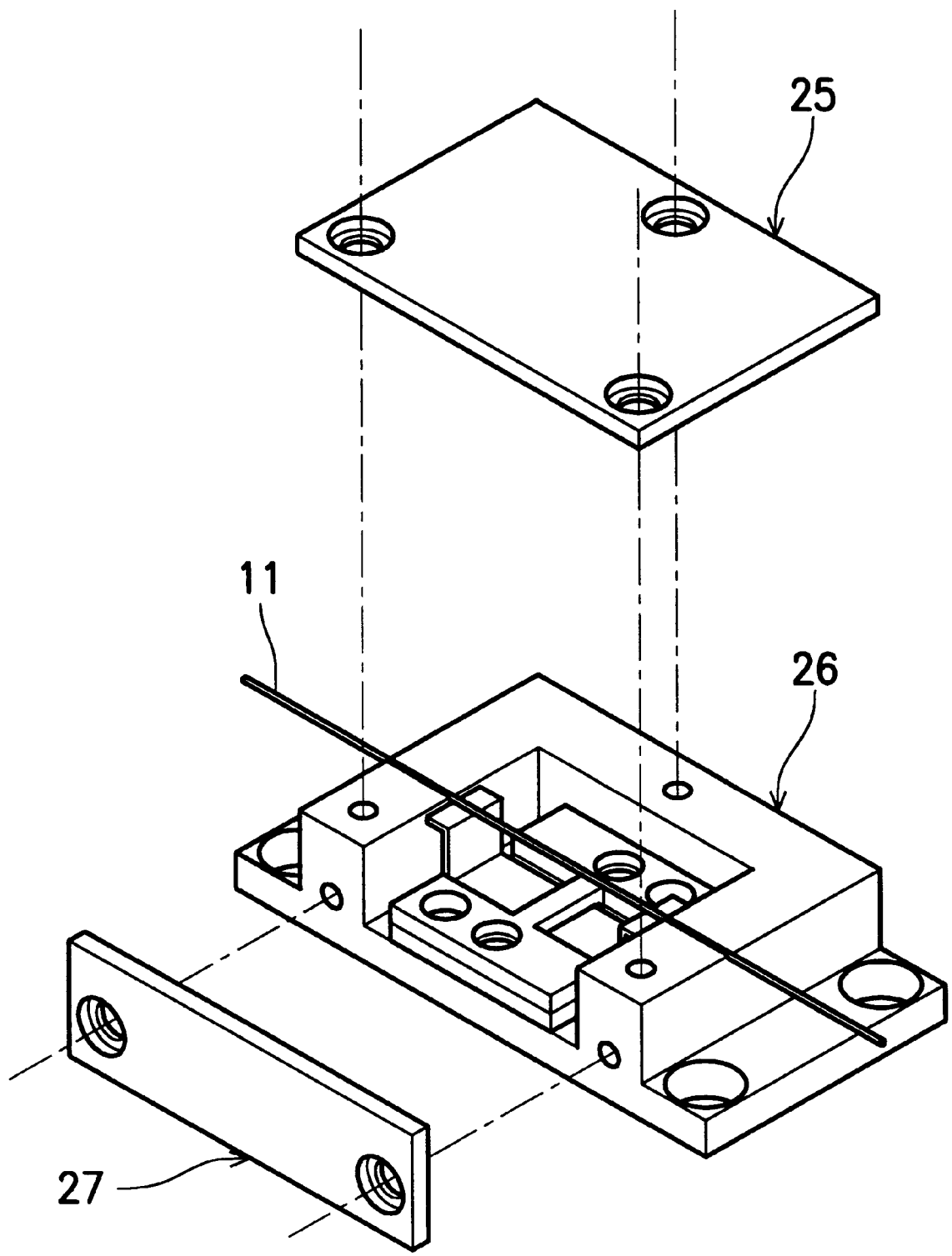
Figure 2D:
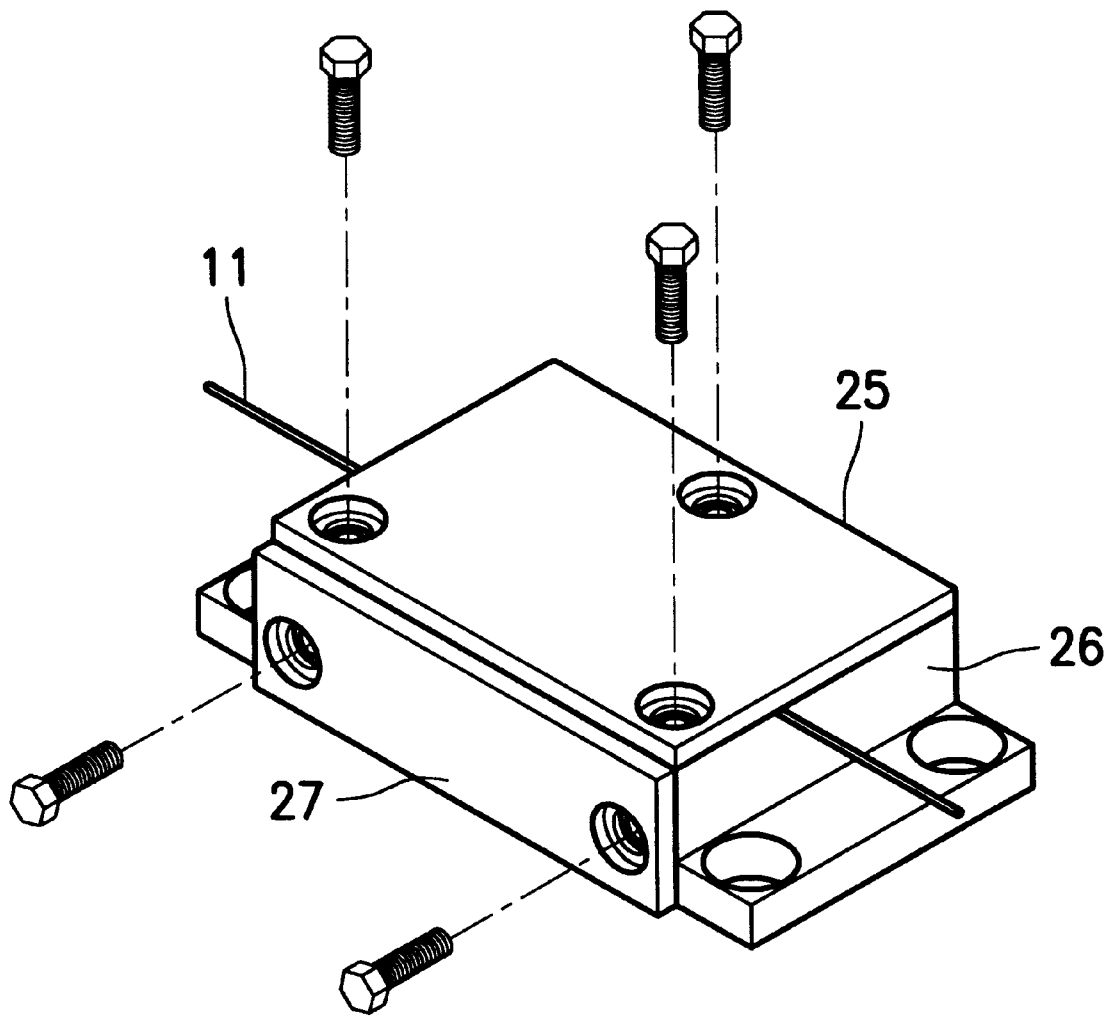

The adjustable compensation device (i.e. the assembly of the bimetal structure 22 and fixing members 23, 24) is then packaged by a top cover 25, a base 26 and a side cover 27. On the base 26 are provided a cavity 261 and two grooves 262. The adjustable compensation device is put into the cavity 261 of the base 26, as shown in FIG. 2C, with the optical fiber 11 received in the grooves 262. Glue is applied to the grooves 262 so as to fix the optical fiber. This can prevent an external force, such as a pull at the optical fiber, from destroying the adjustable compensation device. Then, the top cover 25 and the side cover 27 are screwed onto the base 26 as shown in FIG. 2D.

Figure 3:
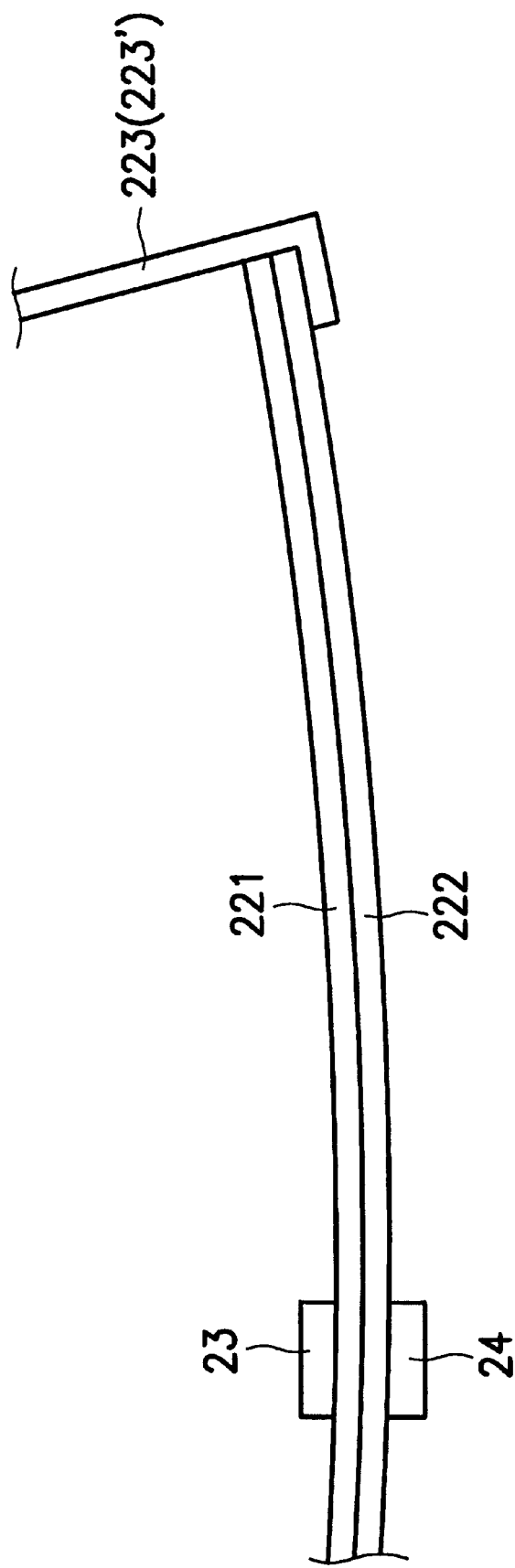
FIG. 3 shows the bimetal structure of the adjustable compensation device in FIG. 2A in a raised temperature.

How the present invention solves the problem arising from a temperature change is now discussed. The bimetal structure 22 bends in a raised surrounding temperature, as shown in FIG. 3, due to different thermal expansion coefficients between the two metal plates 221, 222. In the present invention, however, it is intended to control the horizontal displacement of the arm 13 or 13' by way of fastening the metal plates 221, 222 with the fixing members 23, 24:

The bimetal structure 22 fixed by the top fixing member 23 and bottom fixing member 24 behaves like a cantilever beam. The general formula for the bending of the cantilever beam due to the change of temperature is as follows:

$$\frac{1}{R_t} - \frac{1}{R_o} = \frac{6(\alpha_2 - \alpha_1)(1+m)^2}{3(1+m)^2 + (1+mn)\left(m^2 + \frac{1}{mn}\right)} \cdot \frac{T_t - T_o}{S} \quad (1)$$

where $R_t$ is the radius of curvature of the metal plates at temperature $T_t$;

$R_o$ is the radius of curvature of the metal plates at temperature $T_o$;

$m = S_1/S_2$, where $S_1$ is the thickness of the metal plate 221 and $S_2$ is the thickness of the metal plate 222;

$n = E_1/E_2$, where $E_1$ is the modulus of elasticity of the metal plate 221 and $E_2$ is the modulus of elasticity of the metal plate 222;

$\alpha_1$ is the coefficient of thermal expansion of the metal plate 221;

$\alpha_2$ is the coefficient of thermal expansion of the metal plate 222; and $S = S_1 + S_2$.

If the metal plates are flat at temperature $T_o$, then $R_o = \infty$ and $1/R_o = 0$.

Assuming the thicknesses of the two metal plates 221, 222 are the same. That is, $S_1 = S_2 = S/2$. Now referring to FIG. 4, from the right angle EFG, we obtain:

$$\left(R_t + \frac{S}{2}\right)^2 = \left(R_t + \frac{S}{2} - A\right)^2 + L^2 \quad (2)$$

where

A is the deflection of the cantilever beam; and

L is the length of the cantilever beam.

Equation (2) can be rewritten as:

$$\frac{1}{R_t} = \frac{2A}{L^2 + A^2 - AS} \quad (3)$$

while subtracting equation (3) from equation (1), we obtain:

$$\frac{2A}{L^2 + A^2 - AS} = \frac{6(\alpha_2 - \alpha_1)(1+m)^2}{3(1+m)^2 + (1+mn)\left(m^2 + \frac{1}{mn}\right)} \cdot \frac{T_t - T_o}{S} \quad (4)$$

Figure 4:
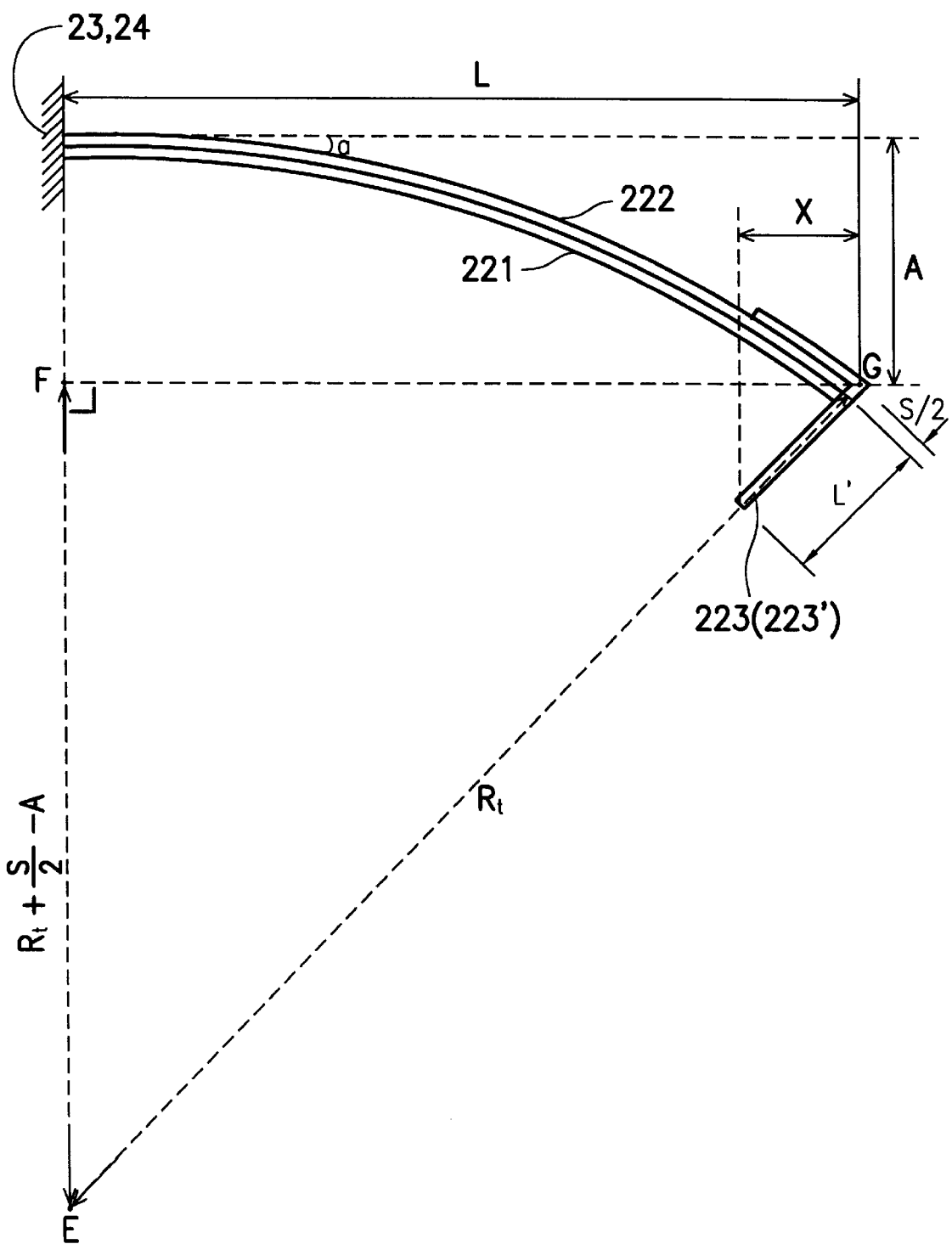
FIG. 4 shows the adjustable compensation device for fiber Bragg gratings in accordance with FIG. 3, used for geometrically analyzing the bent bimetal structure in a raised temperature.

Furthermore, in FIG. 4, reference notation "a" is the inclined angle of the cantilever beam, reference notation "L'" is the length of the arm 223 or 223', and reference notation "x" is the horizontal displacement of the end of the arm 223 or 223'.

Then, we obtain:

$$x = L' \cdot \sin a \quad (5)$$

$$\approx L' \frac{A}{\sqrt{L^2 + A^2}}$$

because tan a = A/L

Figure 5:
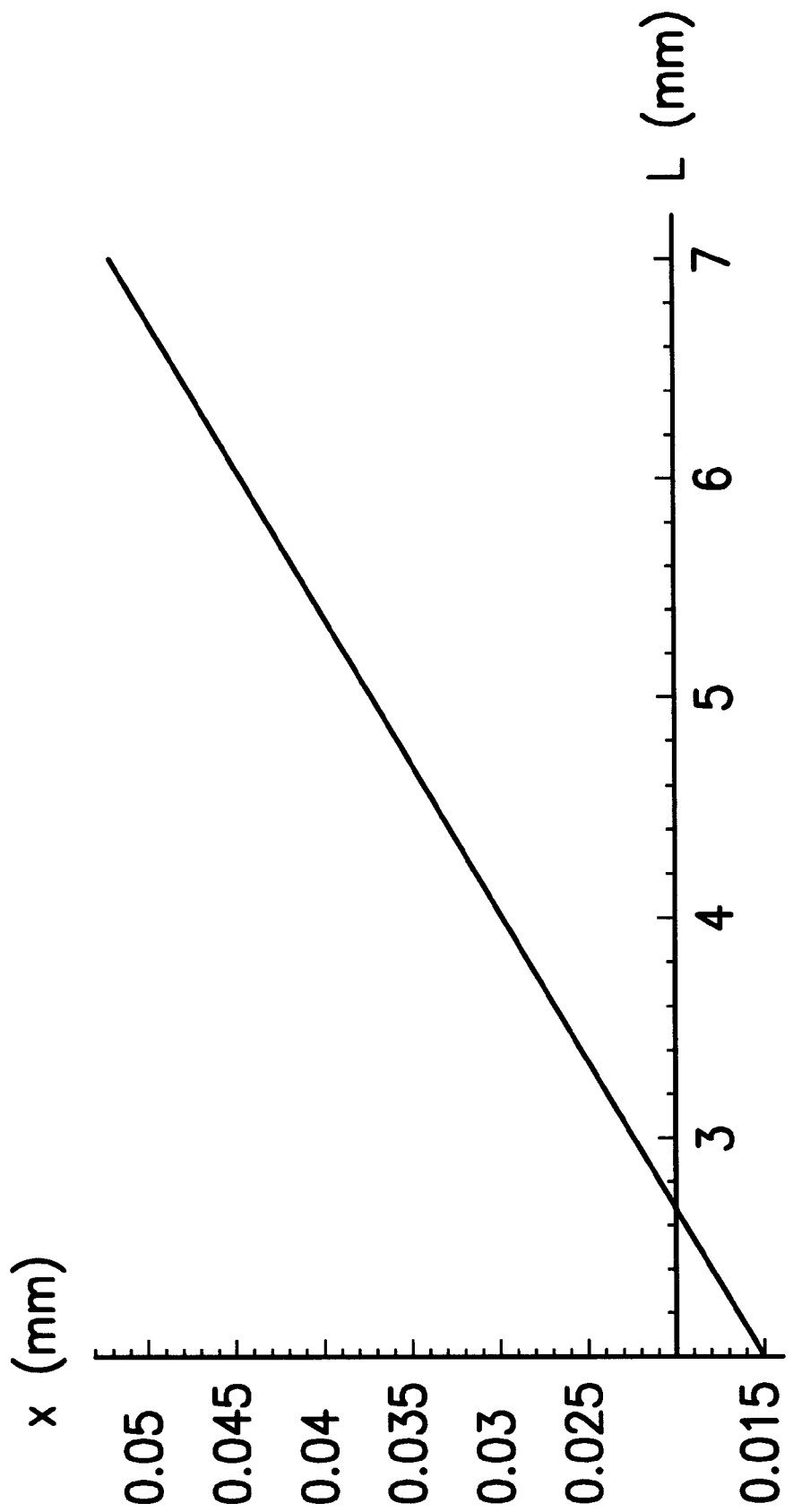
FIG. 5 shows the relationship between the horizontal displacement "X" of the end of the arm and the length "L" of the flexible portion of the metal plate in accordance with the present invention.

In equation (4), $\alpha_1$, $\alpha_2$, m, n, $T_t$, $T_o$ and S are known. Thus, the deflection "A" of the cantilever beam depends on "L". In equation (5), "L'" is known. The horizontal displacement "x" of the end of the arm 223 or 223', on which the optical fiber is glued, depends on "L" and "A". Therefore, the horizontal displacement "x" can be totally determined by "L" according to equations (4) and (5). FIG. 5 shows the relationship between "X" and "L" according to equations (4) and (5), wherein m=1, n=1.287, L'=6.5(mm), $T_t - T_o = 55(°$ C.), and $\alpha_2 - \alpha_1 = 8.4 \times 10^{-6} (1/°$ C.).

Figure 6:
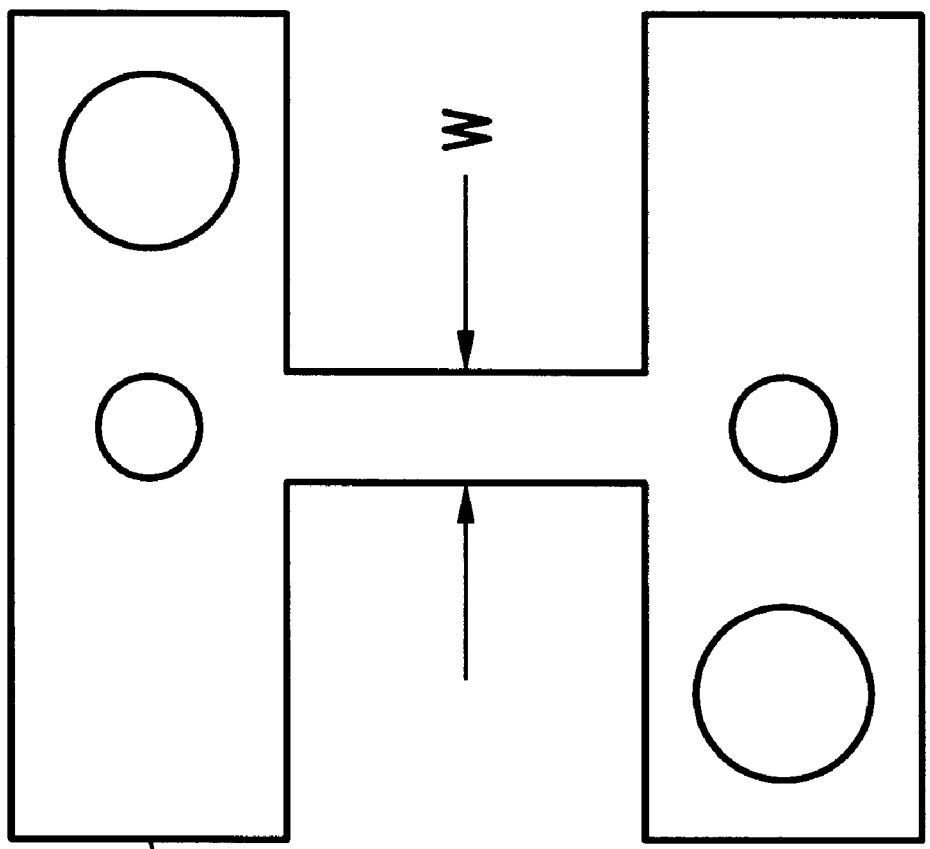
FIG. 6 is a plan view of either of the fixing members of the adjustable compensation device in accordance with the present invention.

Referring to FIG. 6, in the practical application of the present invention, fixing members 23, 24 of various widths "W" are prepared in advance. Then, "L" is determined by clamping the metal plates 221, 222 with the fixing members 23, 24 of a proper width "W". The compensation for the change of the length of the optical fiber due to the raised temperature can be adjusted by changing the fixing members 23, 24 so as to generate different "L". By this arrangement, the change of the length of the optical fiber due to the raised temperature is accurately controlled based on "L", and therefore the change of pitches of FBGs in a raised temperature can be very well compensated.

Referring to FIG. 6, fixingmembers 23, 24 of various widths "W" are produced in advance so that selecting and replacing the fixing members 23, 24 to generate proper "L" is convenient.

Figure 7:
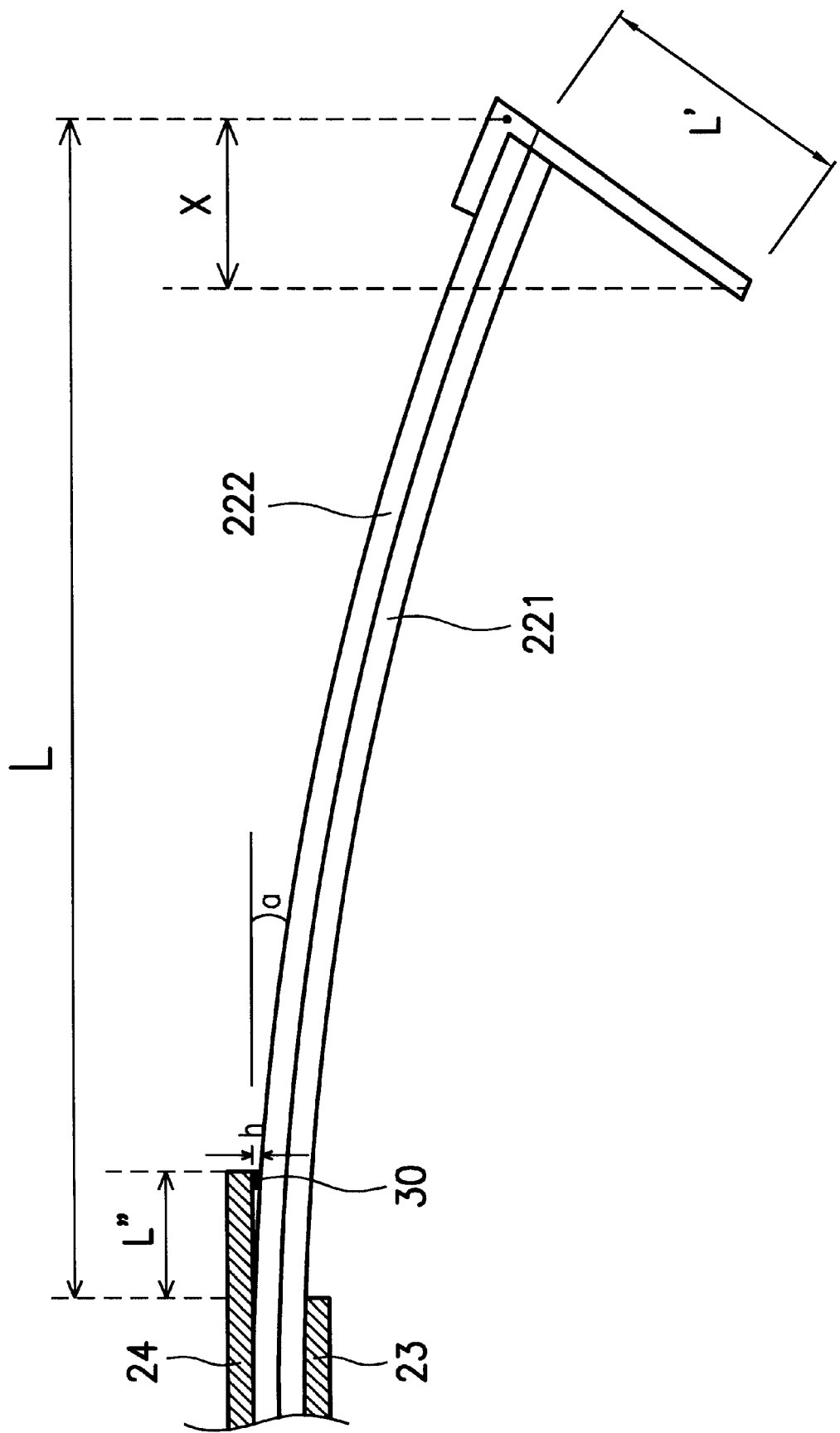
FIG. 7 shows the adjustable compensation device for fiber Bragg gratings in accordance with another example of the present invention, used to compensate the tolerance of pitches of FBGs arising from manufacturing and packaging.

The compensation device of the present invention can also be used to compensate the tolerance of pitches of FBGs arising from manufacturing and packaging. Referring to FIG. 7, a shim 30 of thickness "h" is inserted between the bottom fixing member 24 and the metal plate 30 so as to incline the cantilever beam.

The bottom fixing member 24 is wider than the top fixing member 23 by L". Assuming the inclined angle of the cantilever beam "a" is very small, we obtain:

$$x \approx L' \sin a = L' \frac{h}{\sqrt{L''^2 + h^2}} \quad (6)$$

Figure 8:
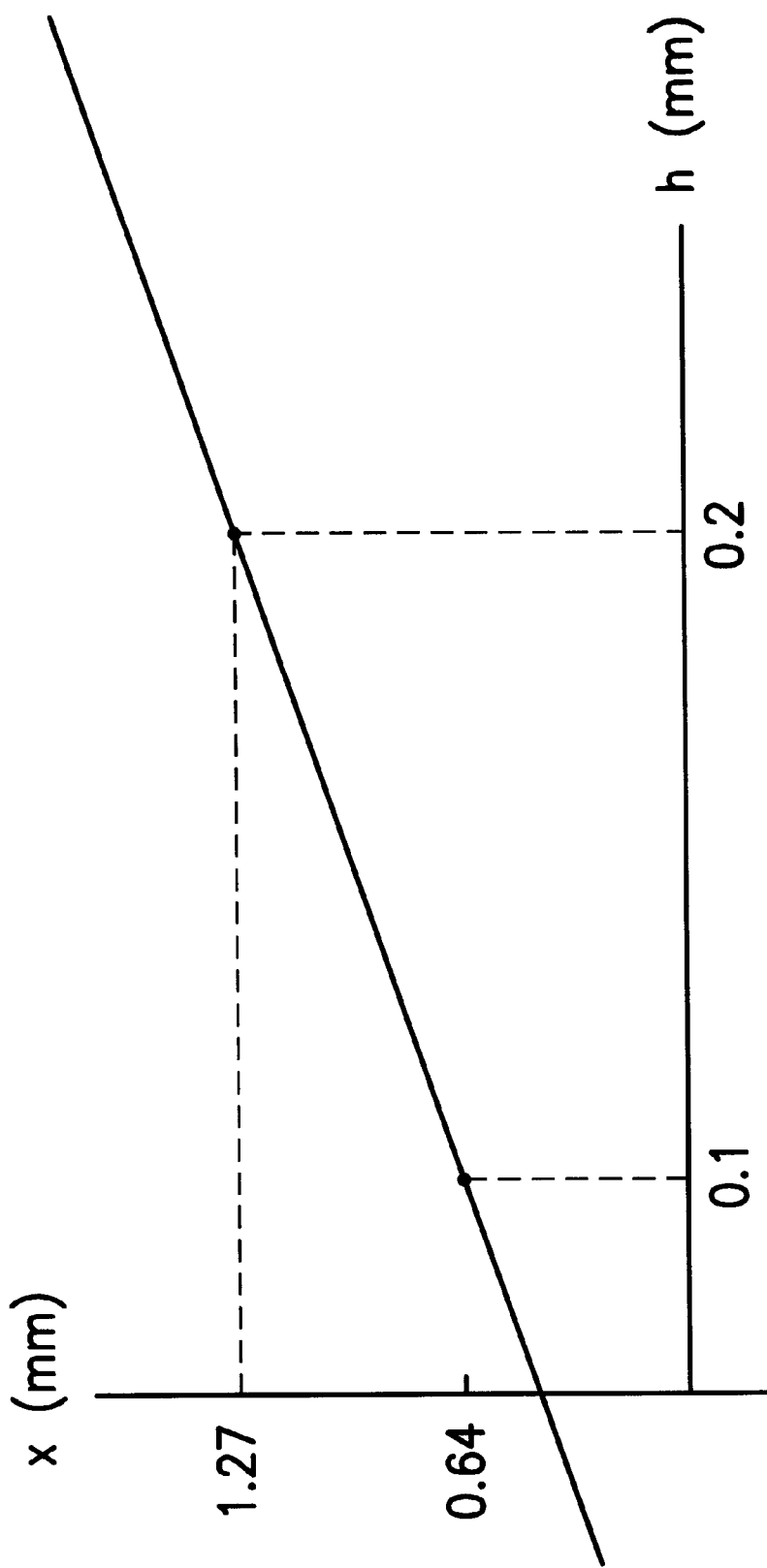
FIG. 8 shows the relationship between the horizontal displacement "X" of the end of the arm and the thickness "h" of the shim in accordance with the present invention.

In equation (6), L' and L" are known. Thus, the horizontal displacement "x" of the end of the arm 223 or 223" is determined by the controllable parameters h. FIG. 8 shows the relationship between "x" and "h", wherein L'=6.5(mm) and L"=1(mm). In other words, we can generate a proper horizontal displacement "x" to compensate the tolerance of pitches of FBGs arising from manufacturing by using the shim 30 of thickness "h" according to equation (6). In the present invention, the tolerance of pitches of FBGs arising from manufacturing and packaging can also be compensated very well by using the shim 30. That is, we can generate a proper horizontal displacement "x" to compensate the tolerance of pitches of FBGs arising from manufacturing and packaging by using the shim 30 of thickness "h" according to equation (6).

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjustable compensation device for fiber Bragg gratings, comprising:

a bimetal structure to which an optical fiber provided with the fiber Bragg gratings is connected; and a fixture for firmly holding the bimetal structure so that the bimetal structure behaves like cantilever beams to compensate pitches of the fiber Bragg gratings.

2. An adjustable compensation device as claimed in claim 1, wherein the fixture includes a first fixing member and a second fixing member holding the bimetal structure in opposite directions.

3. An adjustable compensation device as claimed in claim 2, wherein the first fixing member has a recess receiving the bimetal structure.

4. An adjustable compensation device as claimed in claim 2, wherein the second fixing member is larger than the first fixing member and the adjustable compensation device further comprises a shim inserted between the bimetal structure and the second fixing member so as to incline the bimetal structure.

* * * * *